United States Patent
Zhu (10) Patent No.: US 9,727,487 B2
(45) Date of Patent: *Aug. 8, 2017

(54) CACHE MANAGEMENT METHOD AND APPARATUS FOR NON-VOLATILE STORAGE DEVICE

(71) Applicant: HUAWEI TECHNOLOGIES CO., LTD., Shenzhen, Guangdong (CN)

(72) Inventor: Junhua Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,056

(22) Filed: Nov. 10, 2016

(65) Prior Publication Data

US 2017/0060773 A1    Mar. 2, 2017

Related U.S. Application Data (63) Continuation of application No. 14/546,797, filed on Nov. 18, 2014, now Pat. No. 9,524,245, which is a
(Continued)

(30) Foreign Application Priority Data

Jun. 20, 2012   (CN) .......................... 2012 1 0205360

(51) Int. Cl.
    *G06F 12/02*   (2006.01)
    *G06F 12/123*  (2016.01)
    (Continued)

(52) U.S. Cl.
    CPC ........ *G06F 12/123* (2013.01); *G06F 12/0246* (2013.01); *G06F 12/0871* (2013.01);
    (Continued)

(58) Field of Classification Search
    None
    See application file for complete search history.

(56) References Cited

U.S. PATENT DOCUMENTS

| 6,996,676 B2 | 2/2006 | Megiddo et al. |
| 7,058,766 B2 | 6/2006 | Modha |

(Continued)

FOREIGN PATENT DOCUMENTS

| CN | 102156753 A | 8/2011 |
| CN | 102160038 A | 8/2011 |

(Continued)

OTHER PUBLICATIONS

Nimrod Megiddo et al. A self-tuning, low-overhead replacement cache, USENIX File & Storage Technologies Conference (FAST), Mar. 31, 2003. total 16 pages.

(Continued)

*Primary Examiner* — Mano Padmanabhan
*Assistant Examiner* — Jean Edouard
(74) *Attorney, Agent, or Firm* — Huawei Technologies Co., Ltd.

(57) ABSTRACT

Embodiments of the present invention disclose a method and apparatus of cache management for a non-volatile storage device. The method embodiment includes: determining a size relationship between a capacity sum of a clean page subpool and a dirty page subpool and a cache capacity; determining, when the capacity sum is equal to the cache capacity, whether identification information of a to-be-accessed page is in a history list of clean pages or a history list of dirty pages; and when it is determined that the identification information of the to-be-accessed page is in the history list of clean pages, adding a first adjustment value to a clean page subpool capacity threshold; and when the identification information of the to-be-accessed page is in
(Continued)

the history list of dirty pages, subtracting a second adjustment value from the clean page subpool capacity threshold.

24 Claims, 10 Drawing Sheets

Related U.S. Application Data continuation of application No. PCT/CN2013/071688, filed on Feb. 30, 2013.

(51) Int. Cl.
*G06F 12/0871* (2016.01)
*G06F 12/121* (2016.01)

(52) U.S. Cl.
CPC ...... *G06F 12/121* (2013.01); *G06F 2212/214* (2013.01); *G06F 2212/222* (2013.01); *G06F 2212/502* (2013.01); *G06F 2212/604* (2013.01); *G06F 2212/69* (2013.01); *G06F 2212/7204* (2013.01)

(56) References Cited

U.S. PATENT DOCUMENTS

| | | | |
|---|---|---|---|
| 7,096,321 B2 | 8/2006 | Modha | |
| 7,260,679 B2 | 8/2007 | Benhase et al. | |
| 7,783,839 B2 | 8/2010 | Gill et al. | |
| 7,831,796 B2 | 11/2010 | Bansal et al. | |
| 2006/0069876 A1 | 3/2006 | Bansal et al. | |
| 2007/0294494 A1* | 12/2007 | Conti | G06F 12/123 711/158 |
| 2009/0077312 A1* | 3/2009 | Miura | G06F 11/1441 711/113 |
| 2010/0023567 A1 | 1/2010 | Wakai | |
| 2010/0037009 A1* | 2/2010 | Yano | G06F 12/0246 711/103 |
| 2010/0077136 A1* | 3/2010 | Ware | G06F 12/0246 711/103 |
| 2010/0161881 A1* | 6/2010 | Nagadomi | G06F 12/0246 711/103 |
| 2011/0167214 A1* | 7/2011 | Russo | G06F 12/0866 711/113 |
| 2011/0320733 A1* | 12/2011 | Sanford | G06F 12/0871 711/135 |
| 2011/0320766 A1 | 12/2011 | Wu et al. | |
| 2012/0096225 A1 | 4/2012 | Khawand et al. | |
| 2013/0042056 A1* | 2/2013 | Shats | G06F 12/0246 711/103 |
| 2013/0117497 A1* | 5/2013 | Cui | G06F 12/121 711/103 |
| 2013/0339572 A1* | 12/2013 | Fanning | G06F 3/0688 711/102 |
| 2014/0115241 A1* | 4/2014 | Wei | G06F 12/0246 711/103 |

FOREIGN PATENT DOCUMENTS

| | | |
|---|---|---|
| CN | 102411541 A | 4/2012 |
| KR | 20100006625 A | 1/2010 |

OTHER PUBLICATIONS

X. Tang and X. Meng. ACR: An Adaptive Cost-Aware Buffer Replacement Algorithm for Flash Storage Devices, Eleventh International Conference on Mobile Data Management. in Proc. IEEE MDM"2010. total 10 pages.

Heeseung Jo et al. FAB: Flash-Aware Buffer Management Policy for Portable Media Players. IEEE Transactions on Consumer Electronics, vol. 52, No. 2, May 2006. pp. 485-493.

Jung et al., LIRS-WSR: Integration of LIRS and Writes Sequence Reordering for Flash Memory, LNCS 4705, Part I, ICCSA 2007. pp. 224-237.

Jung et al., LRU-WSR: Integration of LRU and Writes Sequence Reordering for Flash Memory, IEEE Transactions on Consumer Electronics, vol. 54, No. 3, Aug. 2008. pp.1215-1223.

H. Lee and H. Bahn, Characterizing Virtual Memory Write References for Efficient Page Replacement in NAND Flash Memory, Modeling, Analysis & Simulation of Computer and Telecommunication Systems, 2009. MASCOTS "09. IEEE International Symposium on, vol., No., 21-23. Sep. 2009. pp. 1-10.

H. Kim and S. Ahn, BPLRU: A Buffer Management Scheme for Improving Random Writes in Flash Storage, 6th USENIX Conference on File and Storage Technologies. USENIX FAST" 2008. pp. 239-252.

S. T. On et al. FD-Buffer: A Buffer Manager for Databases on Flash Disks, in Proc. ACM CIKM"10. Oct. 25-29, 2010. total 11 pages.

Y. Lv et al, Operation-Aware Buffer Management in Flash-based Systems, in Proc. ACM SIGMOD"11. Jun. 12-16, 2011. pp. 13-24.

Y. Ou et al., CFDC—A Flash-aware Replacement Policy for Database Buffer Management, in Proc. ACM DaMoN"09. Jun. 28, 2009. total 6 pages.

Y. Ou and T. Harder, Clean First or Dirty First? A Cost-Aware Self-Adaptive Buffer Replacement Policy, in Proceedings of the Fourteenth International Database Engineering & Applications Symposium (IDEAS"10), 2010. total 8 pages.

Z. Li et al., CCF-LRU: A New Buffer Replacement Algorithm for Flash Memory, IEEE Transactions on Consumer Electronics, vol. 55, No. 3, Aug. 2009. pp. 1351-1359.

\* cited by examiner

CACHE MANAGEMENT METHOD AND APPARATUS FOR NON-VOLATILE STORAGE DEVICE

CROSS-REFERENCE TO RELATED APPLICATIONS

This application is a continuation of U.S. patent application Ser. No. 14/546,797, filed on Nov. 18, 2014, which is a continuation of International Application No. PCT/CN2013/071688, filed on Feb. 20, 2013, The International Application claims priority to Chinese Patent Application No. 201210205360.6, filed on Jun. 20, 2012. All of the aforementioned patent applications are hereby incorporated by reference in their entireties.

TECHNICAL FIELD

Embodiments of the present invention relate to the field of data processing technologies, and in particular, to a cache management method and a cache management apparatus for a non-volatile storage device.

BACKGROUND

With the rapid development of semiconductor technologies, the growth of access bandwidth of storage devices (such as a hard disk) that use magnetic media to record information has fallen far behind the increase of processing speeds of processors. Meanwhile, for various non-volatile storage technologies that are based on semiconductor technologies, such as flash memories and other storage devices, the capacity is continuously raised, the cost is continuously reduced, and the performance-to-cost ratio is continuously improved. Under such a development tendency, non-volatile storage devices based on semiconductors are gradually replacing conventional storage devices based on magnetic media to become main storage devices. Current non-volatile storage devices have an asymmetric read/write feature, and in fact, when a non-volatile storage device is used, a read operation delay is much shorter than a write operation delay.

Although a non-volatile storage device is superior to a conventional storage device in both access delay and actual bandwidth, it is still inferior to a memory, let alone an on-chip cache of a processor. Therefore, an intermediate storage layer (main memory or processor on-chip cache) is needed to serve as a cache between a processor and a non-volatile storage device to improve the actual access bandwidth of the non-volatile storage device.

A cache design scheme specific to conventional storage devices is optimized with a core objective to improve a cache hit rate, and when directly applied to a storage architecture that uses a non-volatile storage device, it results in such problems as an increased average read/write delay due to frequent replacement of dirty pages and a reduced service life of the device. Moreover, if a complex cost model is applied to the storage architecture that uses a non-volatile storage device, the implementation cost is high and the execution efficiency is low.

SUMMARY

Embodiments of the present invention provide a cache management method and a cache management apparatus for a non-volatile storage device to avoid frequent replacement of dirty pages, so as to increase a service life of the storage device, reduce implementation cost, and improve execution efficiency.

Embodiments of the present invention adopt the following technical solutions.

A cache management method for a non-volatile storage device can be applied to a cache system based on a non-volatile storage device. The cache system includes a cache, a non-volatile storage device, and a cache management apparatus. The cache is configured to store page data read from the non-volatile storage device and page data to be written into the non-volatile storage device, and includes a clean page subpool and a dirty page subpool. The non-volatile storage device is configured to store all page data. The cache management apparatus uses the following information to manage the cache. The information includes a clean page subpool capacity threshold, page information of the clean page subpool, a history list of clean pages, page information of the dirty page subpool, and a history list of dirty pages. The page information includes a subpool capacity, the history list of clean pages is configured to store identification information of a historical clean page that is recently displaced from the cache. The history list of dirty pages is configured to store identification information of a historical dirty page that is recently displaced from the cache.

The method includes determining, when it is determined that a to-be-accessed page is neither in the clean page subpool nor in the dirty page subpool, a size relationship between a capacity sum of the clean page subpool and the dirty page subpool and a cache capacity. The method also includes determining, when the capacity sum of the clean page subpool and the dirty page subpool is equal to the cache capacity, whether identification information of the to-be-accessed page is in the history list of clean pages or the history list of dirty pages. When it is determined that the identification information of the to-be-accessed page is in the history list of clean pages, the method includes adding a first adjustment value to the clean page subpool capacity threshold and when the identification information of the to-be-accessed page is in the history list of dirty pages, the method includes subtracting a second adjustment value from the clean page subpool capacity threshold.

A cache management apparatus for a non-volatile storage device can be applied to a cache system based on a non-volatile storage device. The cache system includes a cache, a non-volatile storage device, and a cache management apparatus. The cache is configured to store page data read from the non-volatile storage device and page data to be written into the non-volatile storage device, and includes a clean page subpool and a dirty page subpool. The non-volatile storage device is configured to store all page data. The cache management apparatus uses the following information to manage the cache. The information includes a clean page subpool capacity threshold, page information of the clean page subpool, a history list of clean pages, page information of the dirty page subpool, and a history list of dirty pages, and the page information includes a subpool capacity. The history list of clean pages is configured to store identification information of a historical clean page that is recently displaced from the cache. The history list of dirty pages is configured to store identification information of a historical dirty page that is recently displaced from the cache.

The apparatus includes a determining unit, configured to determine, when it is determined that a to-be-accessed page is neither in the clean page subpool nor in the dirty page subpool, a size relationship between a capacity sum of the clean page subpool and the dirty page subpool and a cache capacity. The determining unit is further configured to determine, when it is determined that the capacity sum of the clean page subpool and the dirty page subpool is equal to the cache capacity, whether identification information of the to-be-accessed page is in the history list of clean pages or the history list of dirty pages. An adjusting unit is configured to add, when the determining unit determines that the identification information of the to-be-accessed page is in the history list of clean pages, a first adjustment value to the clean page subpool capacity threshold. The adjusting unit is further configured to subtract, when the determining unit determines that the identification information of the to-be-accessed page is in the history list of dirty pages, a second adjustment value from the clean page subpool capacity threshold.

In a cache management method and a cache management apparatus for a non-volatile storage device that are provided by the embodiments of the present invention, when a capacity of a clean page subpool exceeds a capacity threshold, the capacity of the clean page subpool is adjusted according to a write operation delay and a read operation delay, thereby implementing control on capacities of the clean page subpool and a dirty page subpool. Because the non-volatile storage device has an asymmetric read/write feature, the capacity of the dirty page subpool can be preferably increased when control is performed on the capacities of the clean page subpool and the dirty page subpool, thereby avoiding frequent replacement of dirty pages, and increasing a service life of the storage device. In addition, a method for calculating an adjustment value is simple and relevant parameters are easily obtainable, which reduces implementation cost and improves execution efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
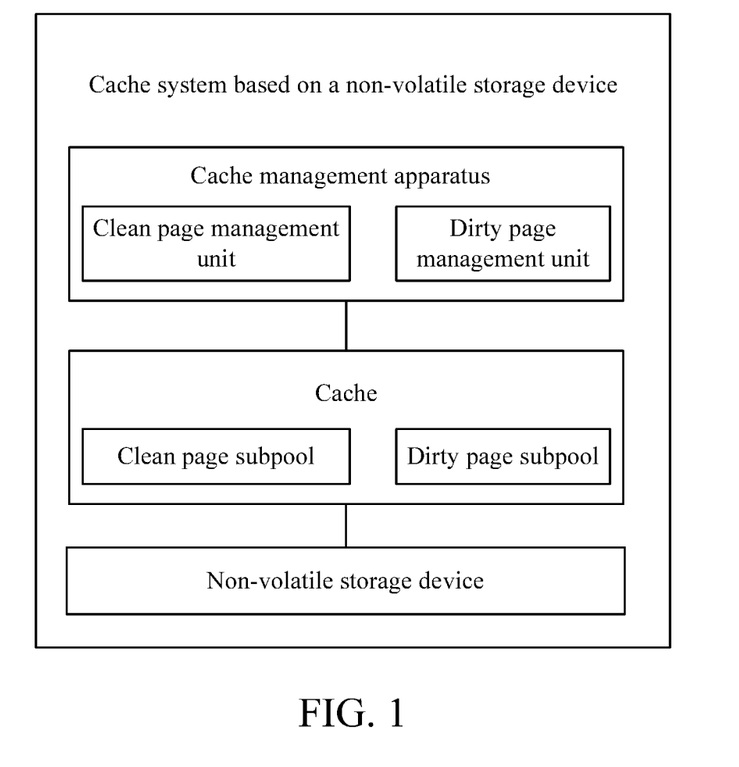
FIG. 1 is a compositional block diagram of a cache system based on a non-volatile storage device according to Embodiment 1 of the present invention.

This embodiment of the present invention provides a cache management method for a non-volatile storage device, which may be applied to a cache system based on a non-volatile storage device. As shown in FIG. 1, the cache system includes a cache, a non-volatile storage device, and a cache management apparatus.

The cache may be configured to store page data read from the non-volatile storage device and page data to be written into the non-volatile storage device, and includes a clean page subpool and a dirty page subpool. The clean page subpool is a set of pages that are not modified, and the dirty page subpool is a set of pages that have been modified. The clean page subpool and the dirty page subpool may be implemented by using one or a combination of a plurality of data structure types, such as a linked list or an array.

The non-volatile storage device, for example, a storage device such as a flash memory or a PCM (phase change memory), may be configured to store all page data.

The cache management apparatus may use the following information to manage the cache, where the information includes a clean page subpool capacity threshold, page information of the clean page subpool, a history list of clean pages, page information of the dirty page subpool, and a history list of dirty pages, and the page information includes a subpool capacity, the history list of clean pages is configured to store identification information of a historical clean page that is recently displaced from the cache, and the history list of dirty pages is configured to store identification information of a historical dirty page that is recently displaced from the cache. To implement independent management on clean pages and dirty pages, a clean page management unit and a dirty page management unit may be arranged in the cache management apparatus. In the embodiment of the present invention, "list" is a term used in protocols and standards within the technical field to which the embodiment of the present invention belongs. A list may be implemented in varied forms, and may be implemented by using a data structure such as a linked list or an array, which is not limited in the embodiment of the present invention.

Further, in a process of implementing the cache system based on a non-volatile storage device, settings are needed in advance so as to ensure normal operation of the cache system, and these settings specifically include the following.

A capacity sum of the clean page subpool and the dirty page subpool does not exceed a physical capacity of the cache. A capacity sum of the clean page subpool and the history list of clean pages does not exceed the physical capacity of the cache. In addition, a capacity sum of the page information of the clean page subpool, the history list of clean pages, the page information of the dirty page subpool, and the history list of dirty pages does not exceed twice the physical capacity of the cache. The history list of clean pages and the history list of dirty pages are both an LRU (least recently used) list. Independent page replacement policies, such as LRU and LFU (least frequently used page replacement algorithm), are used for the clean page subpool and the dirty page subpool, and formats and maintenance of page information of the clean page subpool and the dirty page subpool match page replacement policies selected by the clean page subpool and the dirty page subpool. Definitely, the foregoing settings are only one setting method for implementing the cache system based on a non-volatile storage device, and a specific setting method may be selected according to actual situations, which is not limited thereto.

Figure 2:
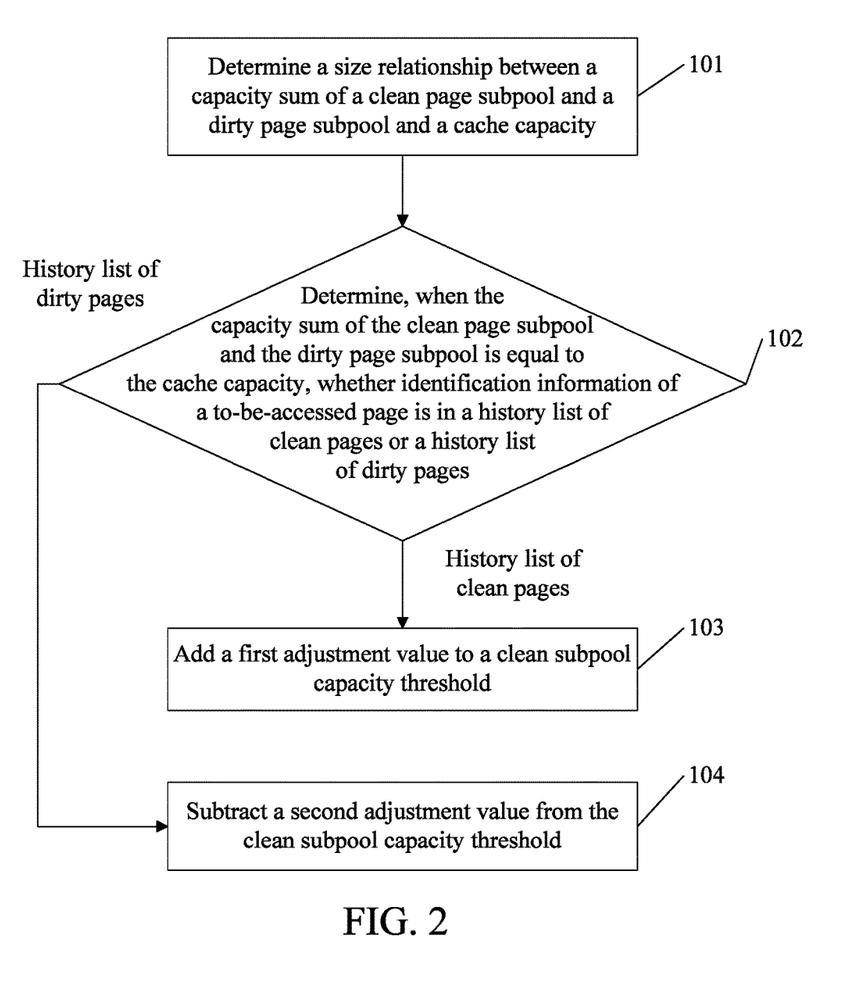
FIG. 2 is a flowchart of a cache management method based on a non-volatile storage device according to Embodiment 1 of the present invention.

In the cache system based on a non-volatile storage device, a cache management method for a non-volatile storage device provided by the embodiment of the present invention, as shown in FIG. 2, specifically includes:

101. The cache management apparatus determines, when it is determined that a to-be-accessed page is neither in the clean page subpool nor in the dirty page subpool, a size relationship between the capacity sum of the clean page subpool and the dirty page subpool and a cache capacity.

102. The cache management apparatus determines, when the capacity sum of the clean page subpool and the dirty page subpool is equal to the cache capacity, whether identification information of the to-be-accessed page is in the history list of clean pages or the history list of dirty pages.

The identification information of the to-be-accessed page may be set to information with an identification function, such as an ID number, which is not enumerated here in the embodiment of the present invention.

103. The cache management apparatus adds, when it is determined that the identification information of the to-be-accessed page is in the history list of clean pages, a first adjustment value to the clean page subpool capacity threshold.

The first adjustment value may be set to a greater value of a quotient of a read operation delay divided by a write operation delay and 1. In addition, the clean page subpool capacity threshold after adjustment cannot exceed the cache capacity.

The read operation delay and the write operation delay are invariable for a same non-volatile storage device, but are possibly different for different non-volatile storage devices.

104. The cache management apparatus subtracts, when the identification information of the to-be-accessed page is in the history list of dirty pages, a second adjustment value from the clean page subpool capacity threshold.

The second adjustment value may be set to a greater value of a quotient of a write operation delay divided by a read operation delay and 1. In addition, the clean page subpool capacity threshold after adjustment cannot exceed the cache capacity.

In the cache management method for a non-volatile storage device provided by the embodiment of the present invention, when a capacity of a clean page subpool exceeds a capacity threshold, the capacity of the clean page subpool is adjusted according to a write operation delay and a read operation delay, thereby implementing control on capacities of the clean page subpool and a dirty page subpool. Because the non-volatile storage device has an asymmetric read/write feature, the capacity of the dirty page subpool can be preferably increased when control is performed on the capacities of the clean page subpool and the dirty page subpool, thereby avoiding frequent replacement of dirty pages, and increasing a service life of the storage device. In addition, a method for calculating an adjustment value is simple and relevant parameters are easily obtainable, which reduces implementation cost and improves execution efficiency.

Embodiment 2

Figure 3A:
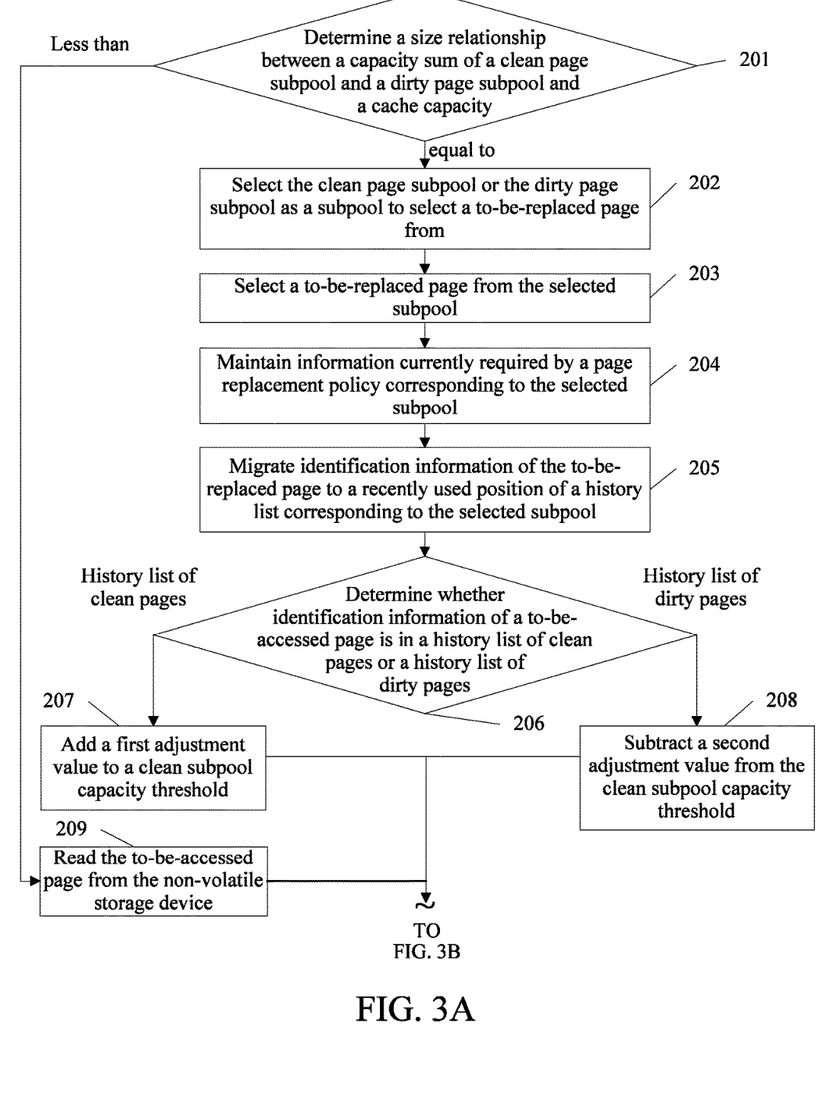
FIG. 3A and FIG. 3B are flowcharts of a cache management method based on a non-volatile storage device according to Embodiment 2 of the present invention.
Figure 3B:
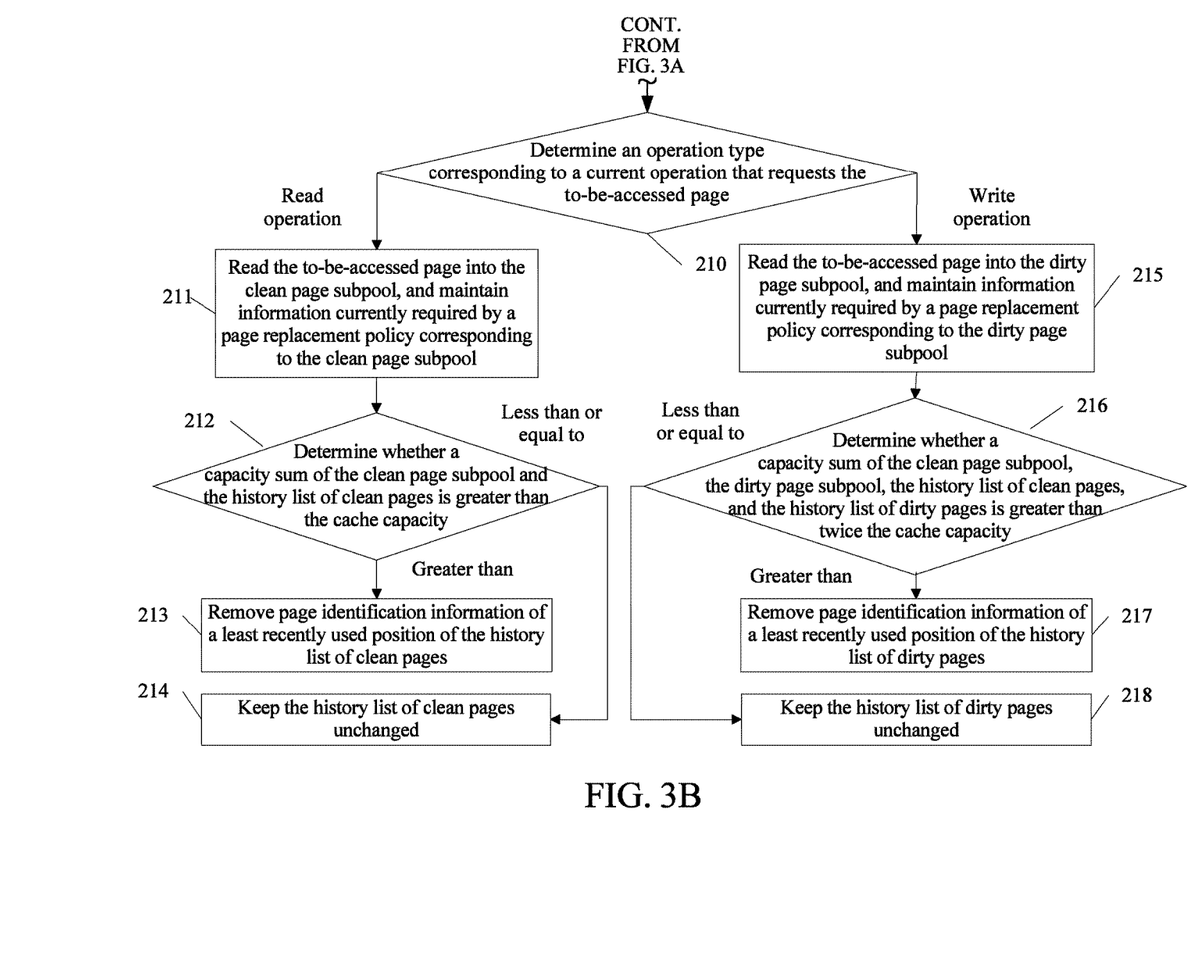

This embodiment of the present invention provides a cache management method for a non-volatile storage device, which may also be applied to the cache system that is based on a non-volatile storage device and shown in FIG. 1, and a setting method for the cache system may also be the same as that in Embodiment 1. As shown in FIG. 3, the method specifically includes the following steps.

201. A cache management apparatus determines, when it is determined that a to-be-accessed page is neither in a clean page subpool nor in a dirty page subpool, a size relationship between a capacity sum of the clean page subpool and the dirty page subpool and a cache capacity. When the capacity sum of the clean page subpool and the dirty page subpool is equal to the cache capacity, step 202 is performed; and when the capacity sum of the clean page subpool and the dirty page subpool is less than the cache capacity, step 209 is performed.

202. The cache management apparatus selects the clean page subpool or the dirty page subpool as a subpool to select a to-be-replaced page from.

Figure 4:
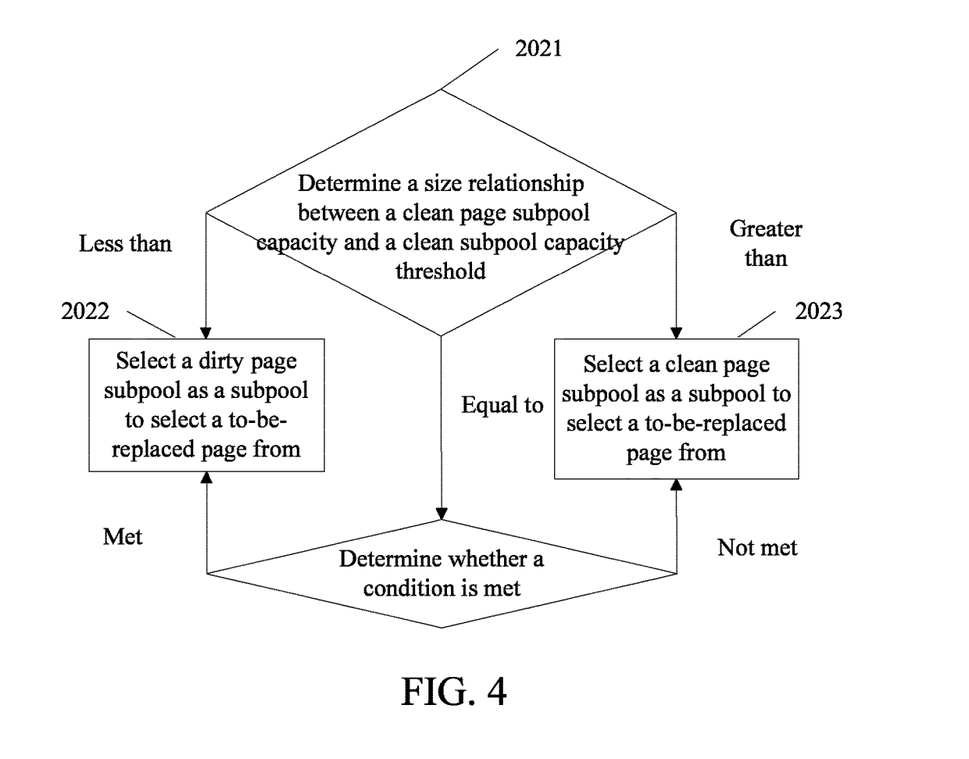
FIG. 4 is a flowchart of another cache management method based on a non-volatile storage device according to Embodiment 2 of the present invention.

A method for implementing step 202 can include the following steps, as shown in FIG. 4.

2021. The cache management apparatus determines a size relationship between a clean page subpool capacity and a clean page subpool capacity threshold. When the clean page subpool capacity is greater than the clean page subpool capacity threshold, step 2022 is performed; when the clean page subpool capacity is less than the clean page subpool capacity threshold, step 2023 is performed; and when the clean page subpool capacity is equal to the clean page subpool capacity threshold, step 2024 is performed.

2022. The cache management apparatus selects the clean page subpool as the subpool to select a to-be-replaced page from.

2023. The cache management apparatus selects the dirty page subpool as the subpool to select a to-be-replaced page from.

2024. The cache management apparatus determines whether the following condition is met, where the condition is that the to-be-accessed page is in a history list of clean pages and a dirty page subpool capacity is greater than 0. If the condition is met, step 2022 is performed; and if the condition is not met, step 2023 is performed.

203. The cache management apparatus selects a to-be-replaced page from the selected subpool according to a page replacement policy corresponding to the selected subpool.

Page replacement policies corresponding to the clean page subpool and the dirty page subpool may be LRU, ACR (Adaptive Cost-aware Replacement), or the like, and the page replacement policies corresponding to the clean page subpool and the dirty page subpool may be set to a same page replacement policy or different page replacement policies, which is not limited in the present invention.

It should be noted that an implementation method for selecting a to-be-replaced page according to a set page replacement policy is a technology commonly known to persons skilled in the art, which is not limited in the embodiment of the present invention.

204. The cache management apparatus maintains information currently required by the page replacement policy corresponding to the selected subpool.

It should be noted that the information currently required by the page replacement policy varies with the page replacement policy. Maintaining information currently required by a page replacement policy is a technology commonly known to persons skilled in the art, which is not detailed here in the embodiment of the present invention.

205. The cache management apparatus migrates identification information of the to-be-replaced page to a recently used position of a history list corresponding to the selected subpool.

A method for implementing step 205 can include the following steps.

When the selected subpool is the clean page subpool, the cache management apparatus migrates the identification information of the to-be-replaced page to a recently used position of the history list of clean pages.

When the selected subpool is the dirty page subpool, the cache management apparatus migrates the identification information of the to-be-replaced page to a recently used position of a history list of dirty pages.

206. The cache management apparatus determines whether identification information of the to-be-accessed page is in the history list of clean pages or the history list of dirty pages. When it is determined that the identification information of the to-be-accessed page is in the history list of clean pages, step 207 is performed; and when the identification information of the to-be-accessed page is in the history list of dirty pages, step 208 is performed.

207. The cache management apparatus adds a first adjustment value to the clean page subpool capacity threshold, where the first adjustment value is a greater value of a quotient of a read operation delay divided by a write operation delay and 1, and performs step 210.

208. The cache management apparatus subtracts a second adjustment value from the clean page subpool capacity threshold, where the second adjustment value is a greater value of a quotient of a write operation delay divided by a read operation delay and 1, and performs step 210.

209. The cache management apparatus reads the to-be-accessed page from the non-volatile storage device, and performs step 210.

210. The cache management apparatus determines an operation type corresponding to a current operation that requests the to-be-accessed page. When it is determined that the operation type is a read operation, step 211 is performed; and when it is determined that the operation type is a write operation, step 215 is performed.

211. The cache management apparatus reads the to-be-accessed page into the clean page subpool, and maintains information currently required by the page replacement policy corresponding to the clean page subpool.

212. The cache management apparatus determines whether a capacity sum of the clean page subpool and the history list of clean pages is greater than the cache capacity. If it is determined that the capacity sum of the clean page subpool and the history list of clean pages is greater than the cache capacity, step 213 is performed; and if it is determined that the capacity sum of the clean page subpool and the history list of clean pages is less than or equal to the cache capacity, step 214 is performed.

213. The cache management apparatus removes page identification information of a least recently used position of the history list of clean pages, and ends the cache management process.

214. The cache management apparatus keeps the history list of clean pages unchanged, and ends the cache management process.

215. The cache management apparatus reads the to-be-accessed page into the dirty page subpool, and maintains information currently required by the page replacement policy corresponding to the dirty page subpool.

216. The cache management apparatus determines whether a capacity sum of the clean page subpool, the dirty page subpool, the history list of clean pages, and the history list of dirty pages is greater than twice the cache capacity. If it is determined that the capacity sum of the clean page subpool, the dirty page subpool, the history list of clean pages, and the history list of dirty pages is greater than twice the cache capacity, step 217 is performed; and if it is determined that the capacity sum of the clean page subpool, the dirty page subpool, the history list of clean pages, and the history list of dirty pages is less than or equal to twice the cache capacity, step 218 is performed.

217. The cache management apparatus removes page identification information of a least recently used position of the history list of dirty pages, and ends the cache management process.

218. The cache management apparatus keeps the history list of dirty pages unchanged, and ends the cache management process.

In this embodiment, when a capacity of a clean page subpool exceeds a capacity threshold, the capacity of the clean page subpool is adjusted according to a write operation delay and a read operation delay, thereby implementing control on capacities of the clean page subpool and a dirty page subpool. Because a non-volatile storage device has an asymmetric read/write feature, the capacity of the dirty page subpool can be preferably increased when control is performed on the capacities of the clean page subpool and the dirty page subpool, thereby avoiding frequent replacement of dirty pages, and increasing a service life of the storage device.

In addition, the capacity of the clean page subpool needs to be adjusted according to only the write operation delay and the read operation delay, and a method for calculating an adjustment value is simple and relevant parameters are easily obtainable, which reduces implementation cost and improves execution efficiency.

Moreover, capacities of history lists are also controlled, which reduces information that needs to be managed by a cache management apparatus, and ensures working performance of the cache management apparatus.

It should be noted that a process in which a processor requests page access may be divided into two parts of processes, where one part of process is directly reading a to-be-accessed page from a cache when the to-be-accessed page is in the cache; and the other part of process is that a page-missing process needs to be performed when the to-be-accessed page is not in the cache. The foregoing steps 201 to 218 belong to the page-missing process.

Figure 5:
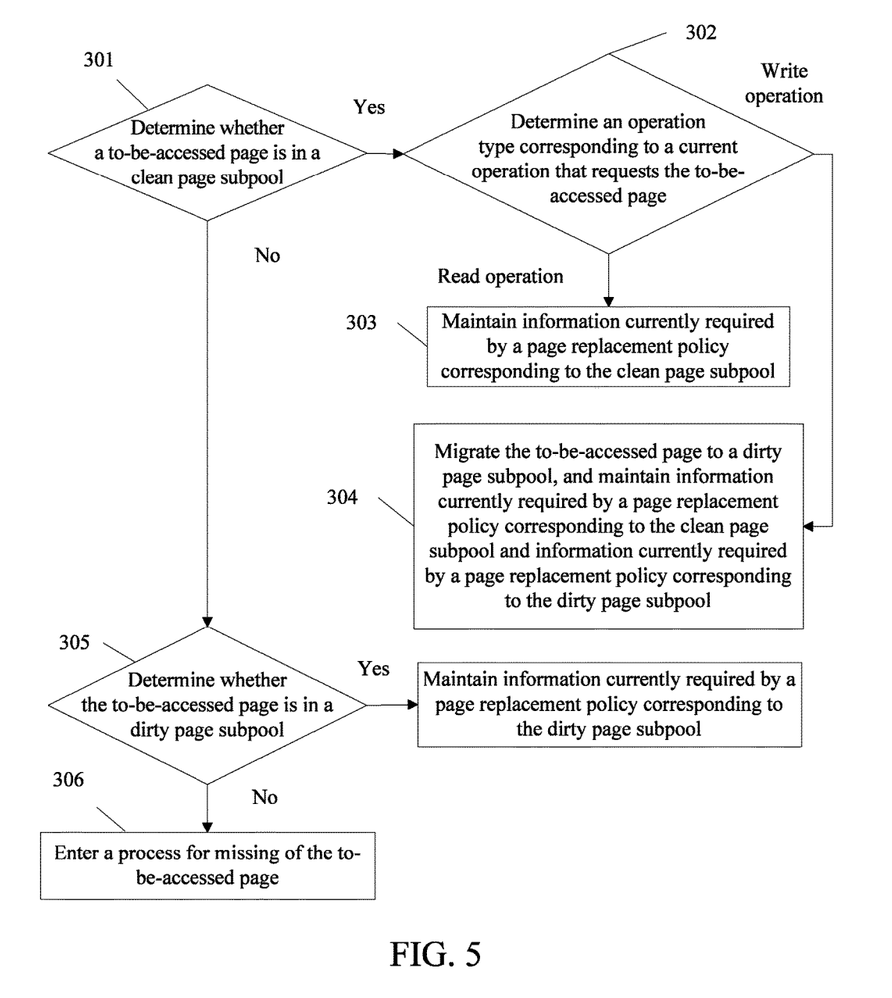
FIG. 5 is a flowchart of another cache management method based on a non-volatile storage device according to Embodiment 2 of the present invention.

Further, a cache management process corresponding to the process in which a processor requests page access is shown in FIG. 5. This embodiment includes the following steps.

301. The cache management apparatus determines whether the to-be-accessed page is in the clean page subpool. If it is determined that the to-be-accessed page is in the clean page subpool, step 302 is performed; and if it is determined that the to-be-accessed page is not in the clean page subpool, step 305 is performed.

302. The cache management apparatus determines an operation type corresponding to a current operation that requests the to-be-accessed page. When it is determined that the operation type is a read operation, step 303 is performed; and when it is determined that the operation type is a write operation, step 304 is performed.

303. The cache management apparatus maintains the information currently required by the page replacement policy corresponding to the clean page subpool.

304. The cache management apparatus migrates the to-be-accessed page to the dirty page subpool, maintains the information currently required by the page replacement policy corresponding to the clean page subpool and the information currently required by the page replacement policy corresponding to the dirty page subpool, and ends the cache management process.

305. The cache management apparatus determines whether the to-be-accessed page is in the dirty page subpool. If it is determined that the to-be-accessed page is in the dirty page subpool, step 306 is performed; and if it is determined that the to-be-accessed page is not in the dirty page subpool, step 307 is performed.

306. The cache management apparatus maintains the information currently required by the page replacement policy corresponding to the dirty page subpool, and ends the cache management process.

307. Enter a process for missing of the to-be-accessed page, that is, the foregoing steps 201 to 218, so that the cache management apparatus reads the to-be-accessed page into the cache, and ends the cache management process.

In this embodiment, steps 301 to 307 implement the cache management process corresponding to the process in which a processor requests page access.

In the cache management method for a non-volatile storage device provided by the embodiment of the present invention, when a capacity of a clean page subpool exceeds a capacity threshold, the capacity of the clean page subpool is adjusted according to a write operation delay and a read operation delay, thereby implementing control on capacities of the clean page subpool and a dirty page subpool. Because the non-volatile storage device has an asymmetric read/write feature, the capacity of the dirty page subpool can be preferably increased when control is performed on the capacities of the clean page subpool and the dirty page subpool, thereby avoiding frequent replacement of dirty pages, and increasing a service life of the storage device.

In addition, the capacity of the clean page subpool needs to be adjusted according to only the write operation delay and the read operation delay, and a method for calculating an adjustment value is simple and relevant parameters are easily obtainable, which reduces implementation cost and improves execution efficiency.

Moreover, capacities of history lists are also controlled, which reduces information that needs to be managed by a cache management apparatus, and ensures working performance of the cache management apparatus.

Embodiment 3

Figure 6:
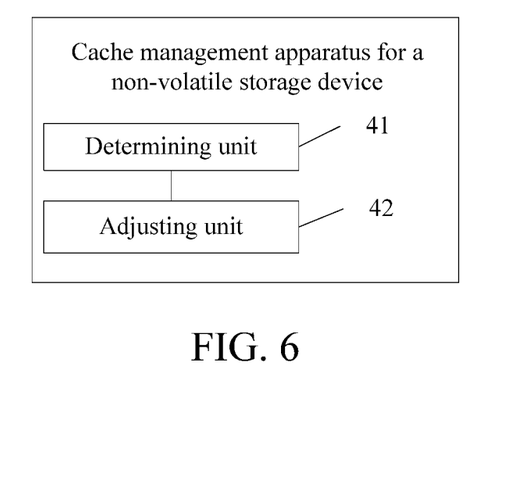
FIG. 6 is a compositional block diagram of a cache management apparatus based on a non-volatile storage device according to Embodiment 3 of the present invention.

The embodiment of the present invention provides a cache management apparatus for a non-volatile storage device. As shown in FIG. 6, the apparatus includes a determining unit 41 and an adjusting unit 42.

The determining unit 41 is configured to determine, when it is determined that a to-be-accessed page is neither in a clean page subpool nor in a dirty page subpool, a size relationship between a capacity sum of the clean page subpool and the dirty page subpool and a cache capacity.

The determining unit 41 is further configured to determine, when it is determined that the capacity sum of the clean page subpool and the dirty page subpool is equal to the cache capacity, whether identification information of the to-be-accessed page is in a history list of clean pages or a history list of dirty pages.

The adjusting unit 42 is configured to add, when the determining unit 41 determines that the identification information of the to-be-accessed page is in the history list of clean pages, a first adjustment value to a clean page subpool capacity threshold, where the first adjustment value is a greater value of a quotient of a read operation delay divided by a write operation delay and 1.

The adjusting unit 42 is further configured to subtract, when the determining unit 41 determines that the identification information of the to-be-accessed page is in the history list of dirty pages, a second adjustment value from the clean page subpool capacity threshold, where the second adjustment value is a greater value of a quotient of a write operation delay divided by a read operation delay and 1.

Figure 7:
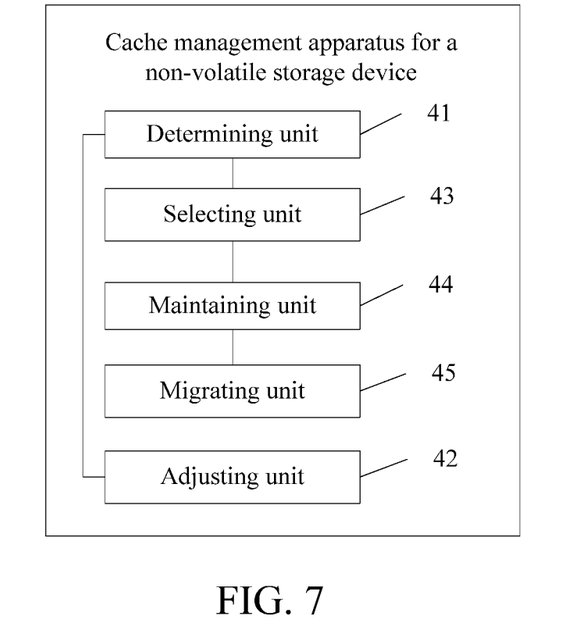
FIG. 7 is a compositional block diagram of another cache management apparatus based on a non-volatile storage device according to Embodiment 3 of the present invention.

Optionally, as shown in FIG. 7, the apparatus further includes a selecting unit 43, a maintaining unit 44, and a migrating unit 45.

The selecting unit 43 is configured to select, when the determining unit 41 determines that the capacity sum of the clean page subpool and the dirty page subpool is equal to the cache capacity, the clean page subpool or the dirty page subpool as a subpool to select a to-be-replaced page from. The selecting unit 43 is configured to select a to-be-replaced page from the selected subpool according to a page replacement policy corresponding to the selected subpool.

The maintaining unit 44 is configured to maintain information currently required by the page replacement policy corresponding to the subpool selected by the selecting unit 43.

The migrating unit 45 is configured to migrate identification information of the to-be-replaced page to a recently used position of a history list corresponding to the selected subpool.

Figure 8:
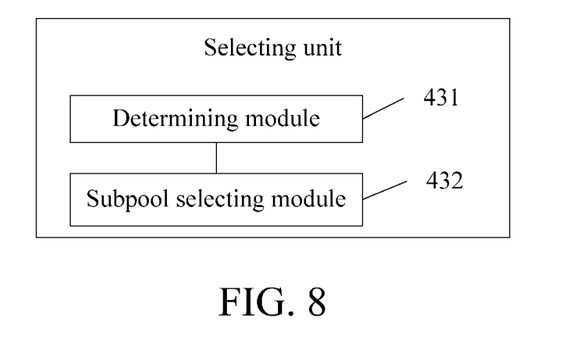
FIG. 8 is a compositional block diagram of another cache management apparatus based on a non-volatile storage device according to Embodiment 3 of the present invention.

Optionally, as shown in FIG. 8, the selecting unit 43 further includes a determining module 431 and a subpool selecting module 432.

The determining module 431 is configured to determine a size relationship between a clean page subpool capacity and the clean page subpool capacity threshold.

The subpool selecting module 432 is configured to select, when the determining module 431 determines that the clean page subpool capacity is greater than the clean page subpool capacity threshold, the clean page subpool as the subpool to select a to-be-replaced page from. The sub pool selecting module 432 is configured to select, when the determining module 431 determines that the clean page subpool capacity is less than the clean page subpool capacity threshold, the dirty page subpool as the subpool to select a to-be-replaced page from.

The determining module 431 is configured to determine, when the clean page subpool capacity is equal to the clean page subpool capacity threshold, whether the following condition is met, where the condition is that the to-be-accessed page is in the history list of clean pages and a dirty page subpool capacity is greater than 0.

The subpool selecting module 432 is configured to select, when the determining module 431 determines that the condition is met, the dirty page subpool as the subpool to select a to-be-replaced page from.

The subpool selecting module 432 is configured to select, when the determining module 431 determines that the condition is not met, the clean page subpool as the subpool to select a to-be-replaced page from.

Figure 9:
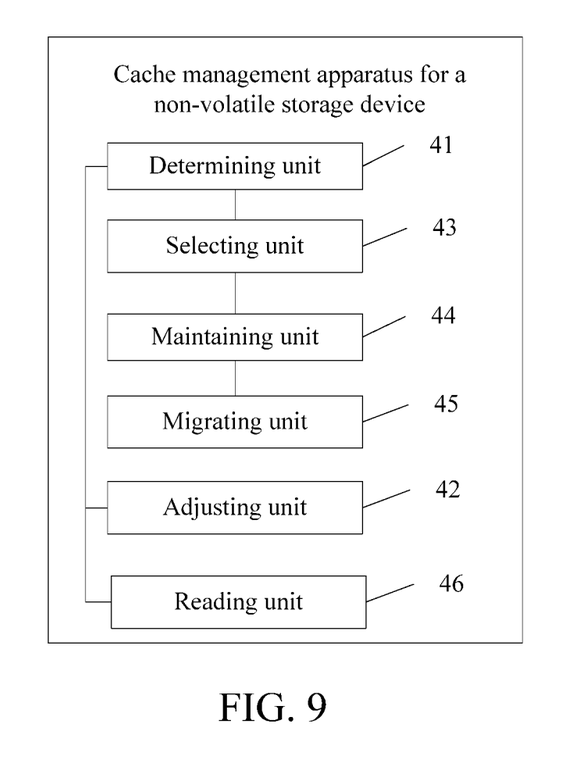
FIG. 9 is a compositional block diagram of another cache management apparatus based on a non-volatile storage device according to Embodiment 3 of the present invention.

Optionally, as shown in FIG. 9, the apparatus further includes a reading unit 46.

The reading unit 46 is configured to read, when the determining unit 41 determines that the capacity sum of the clean page subpool and the dirty page subpool is less than the cache capacity, the to-be-accessed page from the non-volatile storage device.

Optionally, the determining unit 41 is further configured to determine an operation type corresponding to a current operation that requests the to-be-accessed page.

The reading unit 46 is configured to read, when the determining unit 41 determines that the operation type is a read operation, the to-be-accessed page into the clean page subpool.

The maintaining unit 44 is configured to maintain information currently required by a page replacement policy corresponding to the clean page subpool.

The reading unit 46 is configured to read, when the determining unit 41 determines that the operation type is a write operation, the to-be-accessed page into the dirty page subpool.

The maintaining unit 44 is configured to maintain information currently required by a page replacement policy corresponding to the dirty page subpool.

Figure 10:
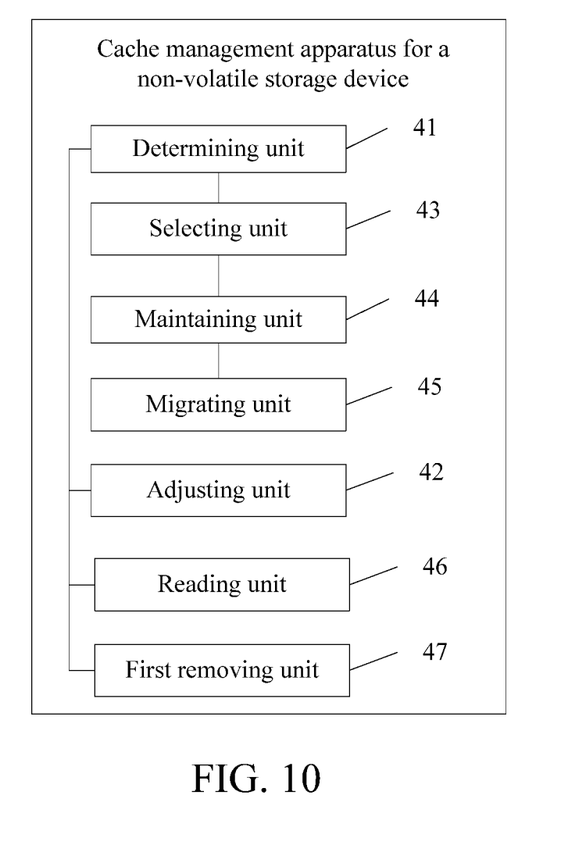
FIG. 10 is a compositional block diagram of another cache management apparatus based on a non-volatile storage device according to Embodiment 3 of the present invention.

Optionally, as shown in FIG. 10, the apparatus further includes a first removing unit 47.

The determining unit 41 is configured to determine whether a capacity sum of the clean page subpool and the history list of clean pages is greater than the cache capacity.

The first removing unit 47 is configured to remove, when the determining unit 41 determines that the capacity sum of the clean page subpool and the history list of clean pages is greater than the cache capacity, page identification information of a least recently used position of the history list of clean pages.

The first removing unit 47 is further configured to keep, when the determining unit 41 determines that the capacity sum of the clean page subpool and the history list of clean pages is less than or equal to the cache capacity, the history list of clean pages unchanged.

Figure 11:
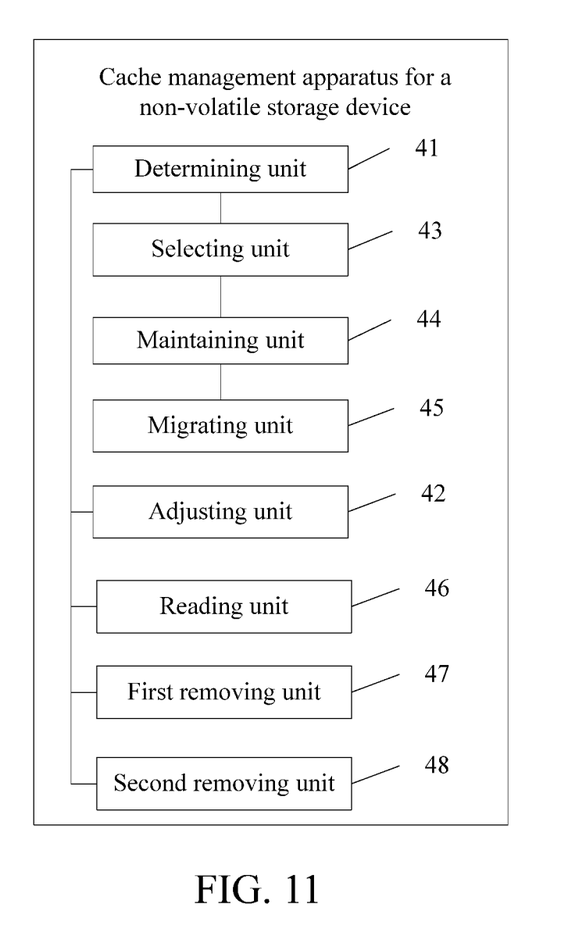
FIG. 11 is a compositional block diagram of another cache management apparatus based on a non-volatile storage device according to Embodiment 3 of the present invention.

Optionally, as shown in FIG. 11, the apparatus further includes a second removing unit 48.

The determining unit 41 is configured to determine whether a capacity sum of the clean page subpool, the dirty page subpool, the history list of clean pages, and the history list of dirty pages is greater than twice the cache capacity.

The second removing unit 48 is configured to remove, when the determining unit 41 determines that the capacity sum of the clean page subpool, the dirty page subpool, the history list of clean pages, and the history list of dirty pages is greater than twice the cache capacity, page identification information of a least recently used position of the history list of dirty pages.

The second removing unit 48 is configured to keep, when the determining unit 41 determines that the capacity sum of the clean page subpool, the dirty page subpool, the history list of clean pages, and the history list of dirty pages is less than or equal to twice the cache capacity, the history list of dirty pages unchanged.

Optionally, the determining unit 41 is configured to determine whether the to-be-accessed page is in the clean page subpool. The determining unit 41 is further configured to determine, when it is determined that the to-be-accessed page is not in the clean page subpool, whether the to-be-accessed page is in the dirty page subpool. The maintaining unit 44 is configured to maintain, when the determining unit 41 determines that the to-be-accessed page is in the dirty page subpool, the information currently required by the page replacement policy corresponding to the dirty page subpool. The determining unit 41 is configured to determine, when it is determined that the to-be-accessed page is not in the dirty page subpool, the size relationship between the capacity sum of the clean page subpool and the dirty page subpool and the cache capacity.

Optionally, the determining unit 41 is further configured to obtain, when it is determined that the to-be-accessed page is in the clean page subpool, the operation type corresponding to the current operation that requests the to-be-accessed page.

The maintaining unit 44 is further configured to maintain, when the determining unit 41 determines that the operation type is a read operation, the information currently required by the page replacement policy corresponding to the clean page subpool.

The migrating unit 45 is configured to migrate, when the determining unit 41 determines that the operation type is a write operation, the to-be-accessed page to the dirty page subpool.

The maintaining unit 44 is further configured to maintain the information currently required by the page replacement policy corresponding to the clean page subpool and the information currently required by the page replacement policy corresponding to the dirty page subpool.

In the cache management apparatus for a non-volatile storage device provided by the embodiment of the present invention, when a capacity of a clean page subpool exceeds a capacity threshold, the capacity of the clean page subpool is adjusted according to a write operation delay and a read operation delay, thereby implementing control on capacities of the clean page subpool and a dirty page subpool. Because the non-volatile storage device has an asymmetric read/write feature, the capacity of the dirty page subpool can be preferably increased when control is performed on the capacities of the clean page subpool and the dirty page subpool, thereby avoiding frequent replacement of dirty pages, and increasing a service life of the storage device.

In addition, the capacity of the clean page subpool needs to be adjusted according to only the write operation delay and the read operation delay, and a method for calculating an adjustment value is simple and relevant parameters are easily obtainable, which reduces implementation cost and improves execution efficiency.

Moreover, capacities of history lists are also controlled, which reduces information that needs to be managed by the cache management apparatus, and ensures working performance of the cache management apparatus.

Based on the foregoing descriptions of the embodiments, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A cache management method applied to a storage system comprising a cache, a non-volatile storage device, and a cache management apparatus, wherein the cache is configured to cache data for the non-volatile storage device, and wherein the method comprises:
   determining, by the cache management apparatus, a first to-be-accessed page is neither in a clean page subpool of the cache nor in a dirty page subpool of the cache, wherein the clean page subpool comprises a set of pages that are not modified in the cache, and the dirty page subpool comprises a set of pages that have been modified in the cache, wherein the clean page subpool, the dirty page subpool and the cache are related via a capacity relationship; and
   increasing, by the cache management apparatus, a maximum capacity of the clean page subpool when the first to-be-accessed page is identified in a history list of clean pages and the capacity relationship indicates that a capacity of the dirty page subpool and the clean page subpool corresponds to a capacity of the cache, wherein the history list of clean pages identifies clean pages that are recently displaced from the cache.

2. The method according to claim 1, further comprising:
   determining, by the cache management apparatus, a second to-be-accessed page is neither in the clean page subpool nor in the dirty page subpool;
   decreasing, by the cache management apparatus, the maximum capacity of the clean page subpool when the second to-be-accessed page is identified in a history list of dirty pages and the capacity relationship indicates that a capacity of the dirty page subpool and the clean page subpool corresponds to a capacity of the cache, wherein the history list of dirty pages identifies dirty pages that are recently displaced from the cache.

3. The method according to claim 1, further comprising:
   selecting, by the cache management apparatus, the clean page subpool or the dirty page subpool as a selection subpool;
   selecting, by the cache management apparatus, a to-be-replaced page from the selection subpool according to a page replacement policy for the selection subpool; and
   adjusting, by the cache management apparatus, a history list of pages of the selection subpool according to identification information of the to-be-replaced page.

4. The method according to claim 3, wherein the clean page subpool is selected as the selection subpool when the capacity of the clean page subpool is greater than the maximum capacity of the clean page subpool.

5. The method according to claim 3, wherein the dirty page subpool is selected as the selection subpool when the capacity of the clean page subpool is less than the maximum capacity of the clean page subpool.

6. The method according to claim 1, further comprising:
   writing, by the cache management apparatus, the first to-be-accessed page read from the non-volatile storage device into the clean page subpool when an operation type of a current operation that requests the first to-be-accessed page is a read operation.

7. The method according to claim 1, further comprising:
   writing, by the cache management apparatus, the first to-be-accessed page read from the non-volatile storage device into the dirty page subpool when an operation type of a current operation that requests the first to-be-accessed is a write operation.

8. The method according to claim 6, further comprising:
   removing, by the cache management apparatus, page identification information of a least recently used position of the history list of clean pages when the capacity sum of the clean page subpool and the history list of clean pages is greater than the capacity of the cache.

9. The method according to claim 7, further comprising:
   removing, by the cache management apparatus, page identification information of a least recently used position of the history list of dirty pages when a capacity of the clean page subpool, the dirty page subpool, the history list of clean pages, and the history list of dirty pages is greater than twice the capacity of the cache.

10. The method according to claim 3, wherein the dirty page subpool is selected as the selection subpool when the first to-be-accessed page is in the history list of clean pages, the capacity of the dirty page subpool is greater than 0 and the capacity of the clean page subpool corresponds to the maximum capacity of the clean page subpool.

11. The method according to claim 3, wherein the clean page subpool is selected as the selection subpool when the first to-be-accessed page is not in the history list of clean pages and the capacity of the clean page subpool corresponds to the maximum capacity of the clean page subpool.

12. The method according to claim 3, wherein the clean page subpool is selected as the selection subpool when the capacity of the dirty page subpool is not greater than 0 and the capacity of the clean page subpool corresponds to the maximum capacity of the clean page subpool.

13. A storage system, comprising a cache, a non-volatile storage device, and a cache management apparatus coupled to the cache and the non-volatile storage device, wherein:
   the cache is configured to cache data for the non-volatile storage device; and
   the cache management apparatus is configured to:
      determine that a first to-be-accessed page is not in a clean page subpool of the cache or in a dirty page subpool of the cache, wherein the clean page subpool comprises a set of pages that are not modified in the cache, the dirty page subpool comprises a set of pages that have been modified in the cache, wherein the clean page subpool, the dirty page subpool and the cache are related via a capacity relationship; and increase a maximum capacity of the clean page subpool when the first to-be-accessed page is identified in a history list of clean pages and the capacity relationship indicates that a capacity of the dirty page subpool and the clean page subpool corresponds to a capacity of the cache, wherein the history list of clean pages identifies clean pages that are recently displaced from the cache.

14. The storage system according to claim 13, wherein the cache management apparatus is further configured to:
   determine a second to-be-accessed page is neither in the clean page subpool nor in the dirty page subpool; and
   decrease the maximum capacity of the clean page subpool when the second to-be-accessed page is identified in a history list of dirty pages and the capacity relationship indicates that a capacity of the dirty page subpool and the clean page subpool corresponds to a capacity of the cache, wherein the history list of dirty pages identifies dirty pages that are recently displaced from the cache.

15. The storage system according to claim 13, wherein the cache management apparatus is further configured to:
   select the clean page subpool or the dirty page subpool as a selection subpool;
   select a to-be-replaced page from the selection subpool according to a page replacement policy for the selection subpool; and
   adjust a history list of pages of the selection subpool according to identification information of the to-be-replaced page.

16. The storage system according to claim 15, wherein the clean page subpool is selected as the selection subpool when the capacity of the clean page subpool is greater than the maximum capacity of the clean page subpool.

17. The storage system according to the claim 15, wherein the dirty page subpool is selected as the selection subpool when the capacity of the clean page subpool is less than the maximum capacity of the clean page subpool.

18. The storage system according to the claim 15, wherein the dirty page subpool is selected as the selection subpool when the first to-be-accessed page is in the history list of clean pages, the capacity of the dirty page subpool is greater than 0, and the capacity of the clean page subpool corresponds to the maximum capacity of the clean page subpool.

19. The storage system according to the claim 15, wherein the clean page subpool is selected as the selection subpool when the first to-be-accessed page is not in the history list of clean pages and the capacity of the clean page subpool corresponds to the maximum capacity of the clean page subpool.

20. The storage system according to the claim 15, wherein the clean page subpool is selected as the selection subpool when the capacity of the dirty page subpool is not greater than 0 and the capacity of the clean page subpool corresponds to the maximum capacity of the clean page subpool.

21. The storage system according to the claim 13, wherein the cache management apparatus is further configured to:
   write the first to-be-accessed page read from the non-volatile storage device into the clean page subpool when an operation type of a current operation that requests the first to-be-accessed page is a read operation.

22. The storage system according to the claim 13, wherein the cache management apparatus is further configured to:
   write the first to-be-accessed page read from the non-volatile storage device into the dirty page subpool when an operation type of a current operation that requests the first to-be-accessed page is a write operation.

23. The storage system according to the claim 21, wherein the cache management apparatus is further configured to:
   remove page identification information of a least recently used position of the history list of clean pages when a capacity sum of the clean page subpool and the history list of clean pages is greater than the capacity of the cache.

24. The storage system according to the claim 22, wherein the cache management apparatus is further configured to:
   remove page identification information of a least recently used position of the history list of dirty pages when a capacity of the clean page subpool, the dirty page subpool, the history list of clean pages, and the history list of dirty pages is greater than twice the capacity of the cache.

* * * * *

UNITED STATES PATENT AND TRADEMARK OFFICE
CERTIFICATE OF CORRECTION

| | |
|---|---|
| PATENT NO. | : 9,727,487 B2 |
| APPLICATION NO. | : 15/348056 |
| DATED | : August 8, 2017 |
| INVENTOR(S) | : Junhua Zhu |

It is certified that error appears in the above-identified patent and that said Letters Patent is hereby corrected as shown below:

On the Title Page

On Page 2, item [60], Related U.S. Application Data, Line 2: delete "30" and insert --20--.

Signed and Sealed this
Third Day of October, 2017

Joseph Matal
*Performing the Functions and Duties of the*
*Under Secretary of Commerce for Intellectual Property and*
*Director of the United States Patent and Trademark Office*